United States Patent
Larsson

(10) Patent No.: US 6,707,862 B1
(45) Date of Patent: Mar. 16, 2004

(54) PREDICTIVE DATA RATE CONTROL IN WIRELESS TRANSMITTERS

(75) Inventor: Torbjorn Larsson, San Diego, CA (US)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/531,997

(22) Filed: Mar. 21, 2000

(51) Int. Cl.$^7$ .............................. H04L 27/22; H04B 7/00
(52) U.S. Cl. ........................................ 375/326; 455/69
(58) Field of Search ................................. 375/262, 142, 375/326; 370/335–468, 449, 462; 455/69

(56) References Cited

U.S. PATENT DOCUMENTS

| | | | |
|---|---|---|---|
| 5,732,328 A | * | 3/1998 | Mitra et al. .................... 455/69 |
| 5,812,938 A | * | 9/1998 | Gilhousen et al. ............. 455/69 |
| 5,862,453 A | * | 1/1999 | Love et al. ..................... 455/69 |
| 5,878,329 A | * | 3/1999 | Mallinckrodt ................. 455/69 |
| 5,896,561 A | * | 4/1999 | Schrader et al. ............. 455/67.1 |
| 5,982,760 A | * | 11/1999 | Chen .......................... 370/335 |
| 6,137,840 A | * | 10/2000 | Tiedemann et al. .......... 375/297 |
| 6,442,398 B1 | * | 8/2002 | Padovani et al. ............. 455/522 |
| 2001/0019541 A1 | * | 9/2001 | Jou et al. ..................... 370/311 |

* cited by examiner

Primary Examiner—Stephen Chin
Assistant Examiner—Lawrence Williams
(74) Attorney, Agent, or Firm—Harness, Dickey & Pierce, PLC

(57) ABSTRACT

A wireless transmitter includes a data rate controller operating to predictively determine a traffic channel data rate for a frame of data stream using a previous data rate, transmitted bit energy of a traffic channel, and a target data throughput. The data rate controller includes a selector, a bit energy computer, a predictor, an estimator, and a comparator.

9 Claims, 12 Drawing Sheets

PREDICTIVE DATA RATE CONTROL IN WIRELESS TRANSMITTERS

BACKGROUND

This disclosure relates to wireless communication systems.

For battery-powered wireless communication terminals, energy and data rate constitute the fundamental resources. The energy consumption in a terminal is proportional to the electric charge drawn from the battery and will thus determine the amount of time that the terminal can operate on a single battery charge. Data rate is directly related to the quality of service perceived by the user. For example, in a packet data application, the average data rate or throughput will determine the latency in delivering any fixed amount of data. In audio or video applications, the available data rate will determine the degree of source data compression and thus the quality of received sound or picture.

In CDMA, multiple transmitters operate within the same frequency band, separated by the use of near-orthogonal spreading codes. However, the separation of signals received from different CDMA transmitters is often imperfect. After de-spreading one user's signal in the receiver, other users' signals will appear as additive white noise. Therefore, terrestrial wireless communication systems based on CDMA often employ sophisticated transmit power control on the reverse (mobile-to-base) link to mitigate the effects of the so-called "near-far" problem. The problem arises when a base station is in communication with multiple mobile stations located at different distances from the base station. The presence of multiple signals arriving at the base station antenna simultaneously also causes an effect known as multipath. Signals that are in phase will add while signals out of phase will subtract.

The difference in power level received at the base station from a "near" mobile and a "far" away mobile can be large because of the high path loss associated with terrestrial radio propagation. In addition, shadowing effects as well as rapid fading caused by multipath propagation will further increase the variation in received power. The multipath fading is caused by a variation of the amplitude or relative phase of one or more of the frequency components in the received signal. In particular, multipath fading may result in the received power falling 20–30 dB below the average level, with successive minima occurring roughly every half of the carrier frequency wavelength. Consequently, with fixed mobile transmit power, the signal transmitted from a mobile located close to the base station may seriously degrade the quality of the signal received from another mobile located farther away from the base station.

Similar considerations apply to the forward (base-to-mobile) link. Although the handoff process in wireless networks attempts to ensure that, the mobile station is always in communication with the base station from which it receives the strongest signal, short-term variations in received signal strength due to multipath propagation and variations in interference level will cause a considerable loss of system capacity unless mitigated with power control.

A well-known remedy to the near-far problem is to control the transmit power of each mobile station in such a way that all the signals arrive at the base station with approximately the same Signal-to-Interference Ratio (SIR) irrespective of where the mobile stations are located. The relevant measure of SIR is $E_b/I_o$, where $E_b$ is the received energy per bit from the intended mobile station and $I_o$ is the received power density from all the mobile transmitters. Furthermore, since the system capacity (i.e. maximum aggregate data rate over all simultaneous calls) is inversely proportional to the interference level, it is desirable to set the target SIR value no higher than required to ensure the desired Quality of Service (QoS). In this context, QoS is commonly measured in terms of Frame Error Rate (FER). In practice, the requested QoS and thus the target SIR may vary from one user to another.

CDMA systems generally use two fundamentally different mechanisms for power control. The first is an "open-loop" power control, intended to compensate for large-scale signal strength variations caused by propagation path loss and shadowing effects. Such variations can be considered as being frequency-independent. Consequently, the large-scale variations in the forward link (base-to-mobile) and the reverse link (mobile-to-base) can be considered identical, even when the two links operate in different frequency bands. In the open-loop power control, the mobile station takes advantage of this particular fact by adjusting its transmit power level autonomously in inverse proportion to the power it receives from the base station. To ensure that only large-scale variations are accounted for, the open-loop power control is based on a long-term average of the measured received power.

The second power control mechanism is a "closed-loop" power control. The closed-loop control compensates for the rapid signal strength variations caused by multipath propagation, changes in interference level and sudden shadowing effects that cannot be compensated for by the slower open loop power control.

The closed-loop power control 100 includes both the base station 102 and the mobile station 104 into a feedback loop arrangement, as illustrated in FIG. 1. The system time is. divided into basic power control (PC) periods with duration $T_{PC}$. In each such power control period, the base station 102 computes a short-term average of the power received from the mobile 104, as well as the power from interfering transmitters. The two measurements are then used to compute the SIR ($E_b/I_o$) value for that period, and the computed SIR value 106 is compared to the target SIR value 108. Based on this comparison, the base station 102 computes a suitable power correction command 110, which is then transmitted back to the mobile 104 over the forward link. The mobile 104 thus can adjust its transmit power once every PC period.

The power correction commands are not protected by error correction coding to maintain the lowest possible delay in the power control loop. Moreover, in order to minimize the forward link capacity loss due to correction commands, it is desirable to encode each command as a single bit. Depending on the value of the received PC bit, the mobile station 104 may either increase or decrease its transmit power level by a predetermined amount, referred to as the PC step size.

SUMMARY

A wireless transmitter capable of selecting a data rate on a frame-by-frame basis is described. The average data rate determines the average transmitted energy per bit of data, and thus, the energy consumption of the transmitter.

The wireless transmitter includes a data rate controller operating to predictively determine a traffic channel data rate for a frame of data using previously transmitted bit energy levels of a traffic channel and a target data throughput. The data rate controller includes a selector, a bit energy computer, a predictor, an estimator, and a comparator.

The selector selects a set of normalized thresholds using a target data throughput. The bit energy computer computes transmitted bit energy on the traffic channel based on a traffic channel signal power and data rate. The predictor predicts the transmitted bit energy in the next frame period using previously transmitted bit energy levels. The estimator is configured to compute a statistical distribution of average bit energy in the frame period using the predicted bit energy. The comparator determines the data rate on the traffic channel using the normalized thresholds, the predicted average bit energy and its statistical distribution.

BRIEF DESCRIPTION OF THE DRAWINGS

Different aspects of the disclosure will be described in reference to the accompanying drawings wherein.

DETAILED DESCRIPTION.

As discussed above, energy preservation in wireless transmission often trades off against data rate increase. Thus, it is desirable to be able to treat energy and data throughput as commodities that can be traded for one another. The precise tradeoff between the two can then be chosen according to the situation and the user's preference. For instance, in a situation where battery charge is running low, a substantial reduction of data rate may be acceptable in order to extend battery lifetime. Such energy-throughput tradeoffs may focus on transmission of data (rather than reception or processing) because the most energy-consuming operating mode in a wireless terminal is at the transmitter. When a wireless terminal is operating in transmit mode, its power consumption is dominated by the power delivered to the power amplifier (PA) stage. Therefore, an appropriate measure of how well energy is utilized by the terminal is the average transmitted energy expended per transmitted data bit.

The present disclosure provides for controlling the data rate of a wireless transmitter in such a way that the energy required for transmitting a fixed but arbitrary amount of data is reduced. The control involves reducing the amount of information, e.g. the number of bits transmitted, in those frames where the bit energy requirement is high. Conversely, the control increases the number of bits in those frames where the bit energy requirement is low. According to one aspect, the control reduces transmit energy per bit in a Code Division. Multiple Access (CDMA) mobile or base station while ensuring a specified average data rate or throughput. In another aspect, the control achieves the largest possible energy reduction within a range of throughputs.

The reduction in the average transmitted bit energy not only extends battery life in battery-powered terminals, but also reduces interference level seen by other users. This reduction is important in CDMA systems, where a reduction of interference level directly translates into a system capacity increase. Therefore, a transmitter incorporating above-described reduction in the average transmitted energy per bit finds application also in base stations and other fixed or mobile terminals where energy consumption is of less importance.

In third-generation wireless systems based on CDMA, such as cdma2000 and Wideband CDMA (W-CDMA), the mobile station transmits a dedicated pilot channel code-multiplexed with one or more traffic channels on the reverse link. This allows the reverse link closed-loop power control to be based on the measured pilot power.

Figure 1:
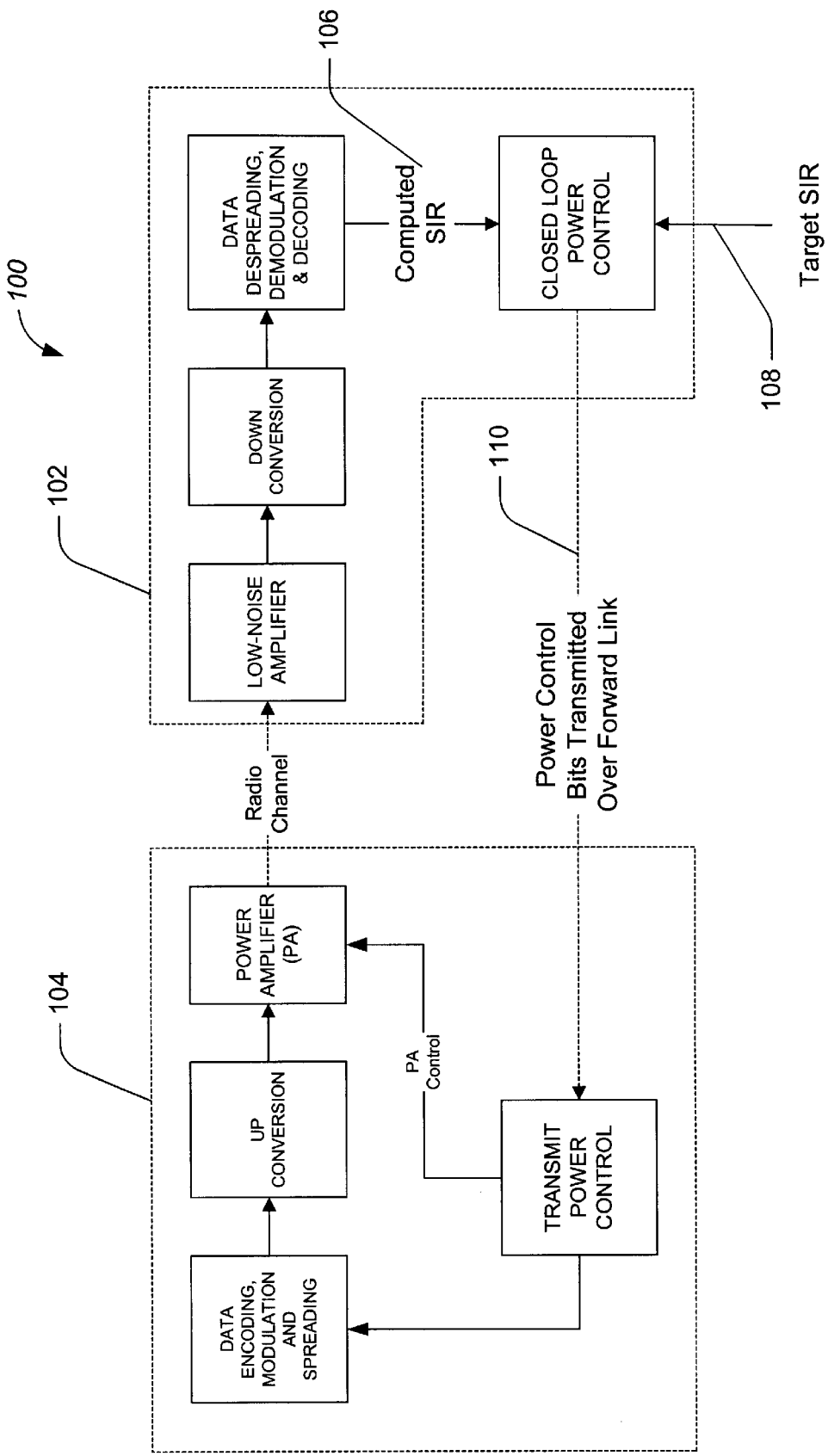
FIG. 1 is a block diagram of a conventional closed-loop power control system.
Figure 2:
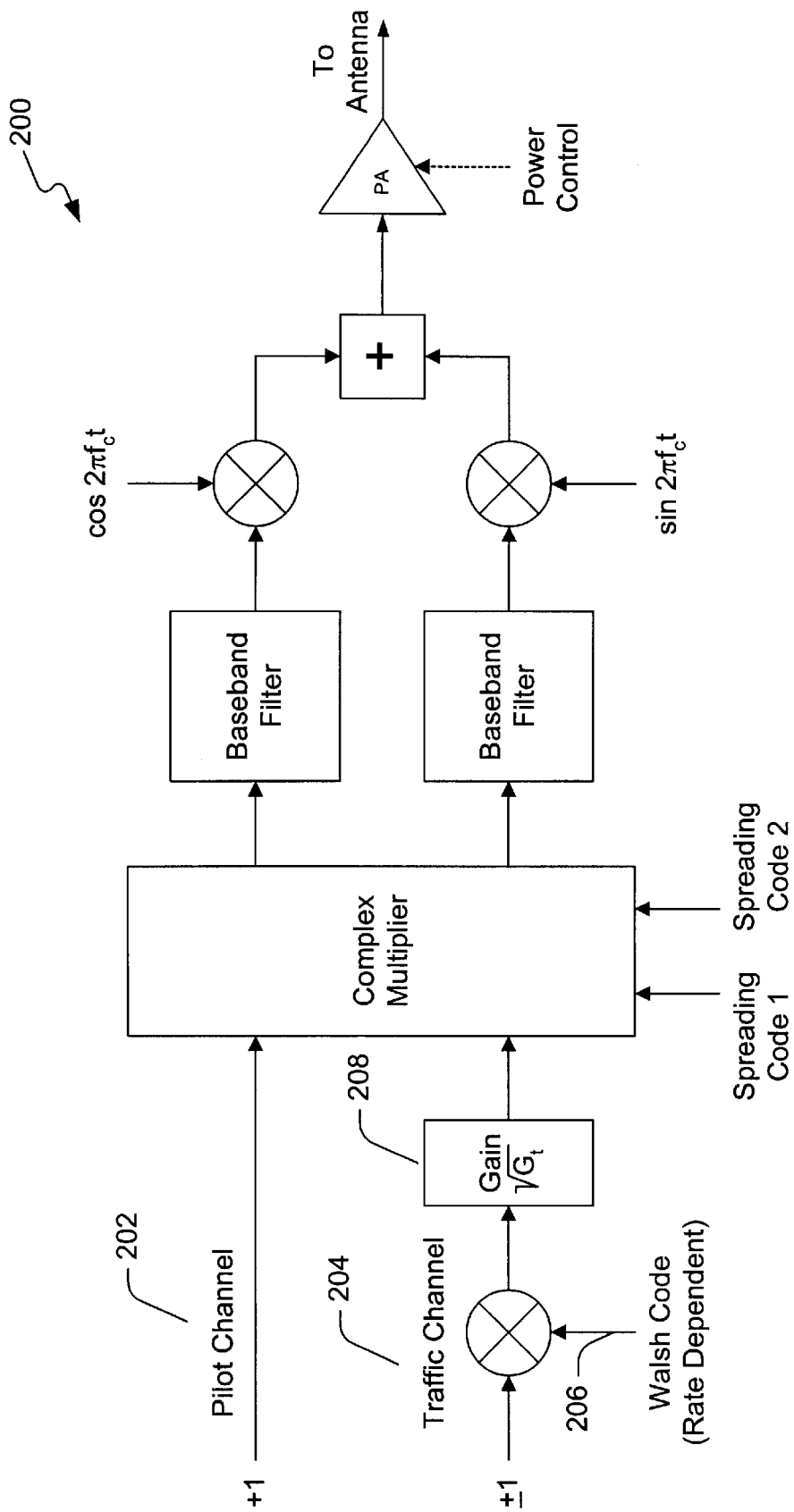
FIG. 2 illustrates a reverse link transmitter structure in cdma2000.

FIG. 2 illustrates a reverse link transmitter structure 200 in cdma2000. An unmodulated pilot channel 202 and a data-carrying traffic channel 204 are multiplexed together using orthogonal Walsh codes 206 and spread in quadrature. The composite quadrature signal is then up-converted, filtered and transmitted on the reverse link. The traffic channel power gain $G_t$ 208 is set relative to the pilot channel gain. If the traffic and pilot power in the $n^{th}$ PC period are $P_t(n)$ and $P_p(n)$, respectively, then the energy per bit on the traffic channel can be computed as $$E_b(n) = \frac{P_t(n)}{R_b} = \frac{G_t P_p(n)}{R_b}, \tag{1}$$

where $R_b$ is the data rate on the traffic channel.

Since the pilot and traffic channels are affected identically by path loss and fading, this relationship holds true both on transmitter and receiver side. If the mobile station changes the data rate on the traffic channel, it must adjust the traffic channel gain $G_t$ so as to maintain the same value of $E_b$. In addition, it may also be necessary to change the pilot power $P_p$, via a change of the power amplifier (PA) gain setting. Thus, the receiving base station must be made aware of the change of data rate in order to correctly compute the received $E_b$ from the measured received pilot power. This can be done by transmitting a rate indicator at the beginning of every frame or by estimation of the data rate directly from the received waveform.

Figure 3:
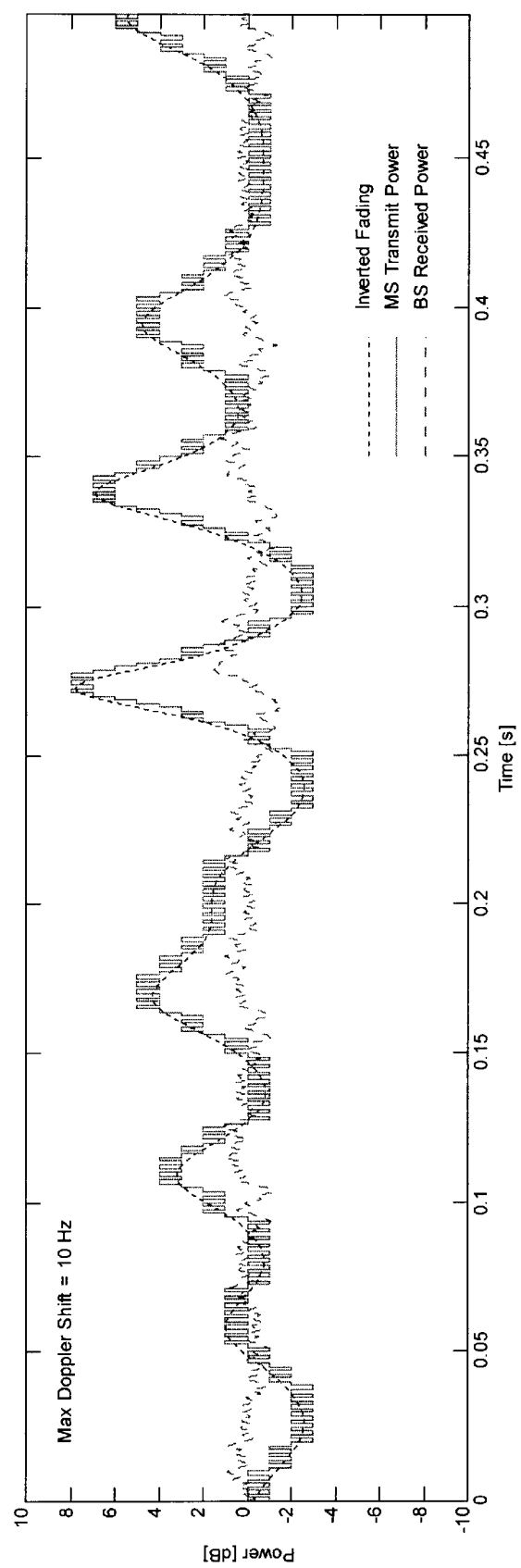
FIG. 3 shows a simulation of the closed-loop power control with fixed data rate over two-path Rayleigh fading channel with maximal-ratio combining in the base station receiver.

FIG. 3 shows a simulation of the closed-loop power control with fixed data rate over two-path Rayleigh fading channel with maximal-ratio combining in the base station receiver. The figure shows the transmitted and received traffic channel power (both appropriately normalized) and the inverted fading amplitude. All are measured in logarithmic (dB) scale. The target received power level has been arbitrarily set to 0 dB. The two multipath fading components were simulated using Jake's multipath model, with the mean power of the second path set 3 dB below that of the first path, and a maximum Doppler shift of 10 Hz. In Jake's model, the distribution of received power along the Doppler frequency axis takes on a U-shape extending from $-f_D$ to $+f_D$, where $f_D$ is the maximum Doppler shift. This gives a fading rate of roughly two times $f_D$, or 20 Hz in the present case. The system parameters used in the simulation were taken from cdma2000, where the base station transmits a power control (PC) bit every $T_{PC}=1.25$ ms, i.e. at a rate of 800 bits/s. The PC step size was set to 1.0 dB. The loop delay in cdma2000 is implementation-dependent, but often varies between one and two PC periods ($T_{PC}$). In the simulation in FIG. 3, the loop delay was set to one PC period (1.25 ms).

In many wireless systems, user data is transmitted in frames of fixed duration, $T_f$. A frame extends over multiple PC periods. For example, in cdma2000, the frame duration is 20 ms whereas the PC period duration is 1.25 ms, giving 16 PC periods per frame. During the transmission of a frame, the transmitted bit energy will fluctuate in response to the power control commands received from the base station. Therefore, the average bit energy over all PC periods in a frame needs to be considered. If $\overline{E}_{b,\,frame}$ denotes this average for some particular frame, the total energy transmitted in the frame can then be expressed as $$E_f = N_b \overline{E}_{b,\,frame}. \quad (2)$$

$N_b = R_b T_f$ is the number of bits transmitted in the frame. The unit of energy is measured in decibels relative to some arbitrary reference level.

$\overline{E}_{b,\,frame}$ often shows considerable variability over time because the transmitter does not exert autonomous control of $\overline{E}_{b,\,frame}$. However, in applications where a fixed data rate is not required, such as packet-switched connections, the wireless transmitter may be able to control the number of bits $N_b$ sent in each frame. This effectively varies the data rate on a frame-by-frame basis. In one embodiment, a change of data rate involves a change of the forward error correction code rate and the repetition of code symbols.

According to one aspect, the transmission of a packet consisting of some fixed amount of data can be considered. For example, let $N_b(j)$ and $\overline{E}_{b,\,frame}(j)$ denote the number of bits and average bit energy, respectively, transmitted in the $j^{th}$ frame in the packet. The average bit energy over the packet is then given by $$\overline{E}_{b,packet} = \frac{\sum_j N_b(j) \overline{E}_{b,frame}(j)}{\sum_j N_b(j)}. \quad (3)$$

The summation is taken over all the frames required to transmit the data in the packet. The denominator in Equation (3) is the total number of bits in the packet.

In Equation (3), it is desirable to achieve a reduction of the average bit energy by appropriately choosing $N_b(j)$ for each frame, while ensuring some specified average data rate over the packet. For a fixed packet size, minimizing the average bit energy over the packet is equivalent to minimizing the total packet energy. In practice, finding an allocation of bit rates that minimizes the average bit energy over the packet is difficult, since this requires the knowledge of future bit energy requirements. However, the multipath fading typically exhibits a stationary behavior over distances corresponding to a few tens of wavelengths. Therefore, as the mobile station travels through the fading pattern, the statistical properties of the received amplitude, such as mean, variance, and fading rate, will remain the same over multiple frames. Furthermore, as long as the closed loop power control is able to track and compensate for the fading, the transmitted bit energy will exhibit a similar short-term stationary behavior, as illustrated by FIG. 3. The present invention takes advantage of this fact by predicting the transmit bit energy requirements in the next frame using previously transmitted bit energy values. A data rate controller in the transmitter performs above-described control, of data rate.

The transmitter operates with some maximum data rate $r_o$ as well as fixed number M of fallback (lower) rates $r_1$, $r_2, \ldots, r_M$. The rates are defined in descending order, so that $r_i > r_{i+1}$. When operating at rate $r_i$, the transmitter sends $n_i$ information bits per frame, where $n_i = r_i * T_f$. As a special case, it is possible to have $n_M = 0$, in which case the traffic channel is gated off when the $M^{th}$ rate is selected.

Figure 4:
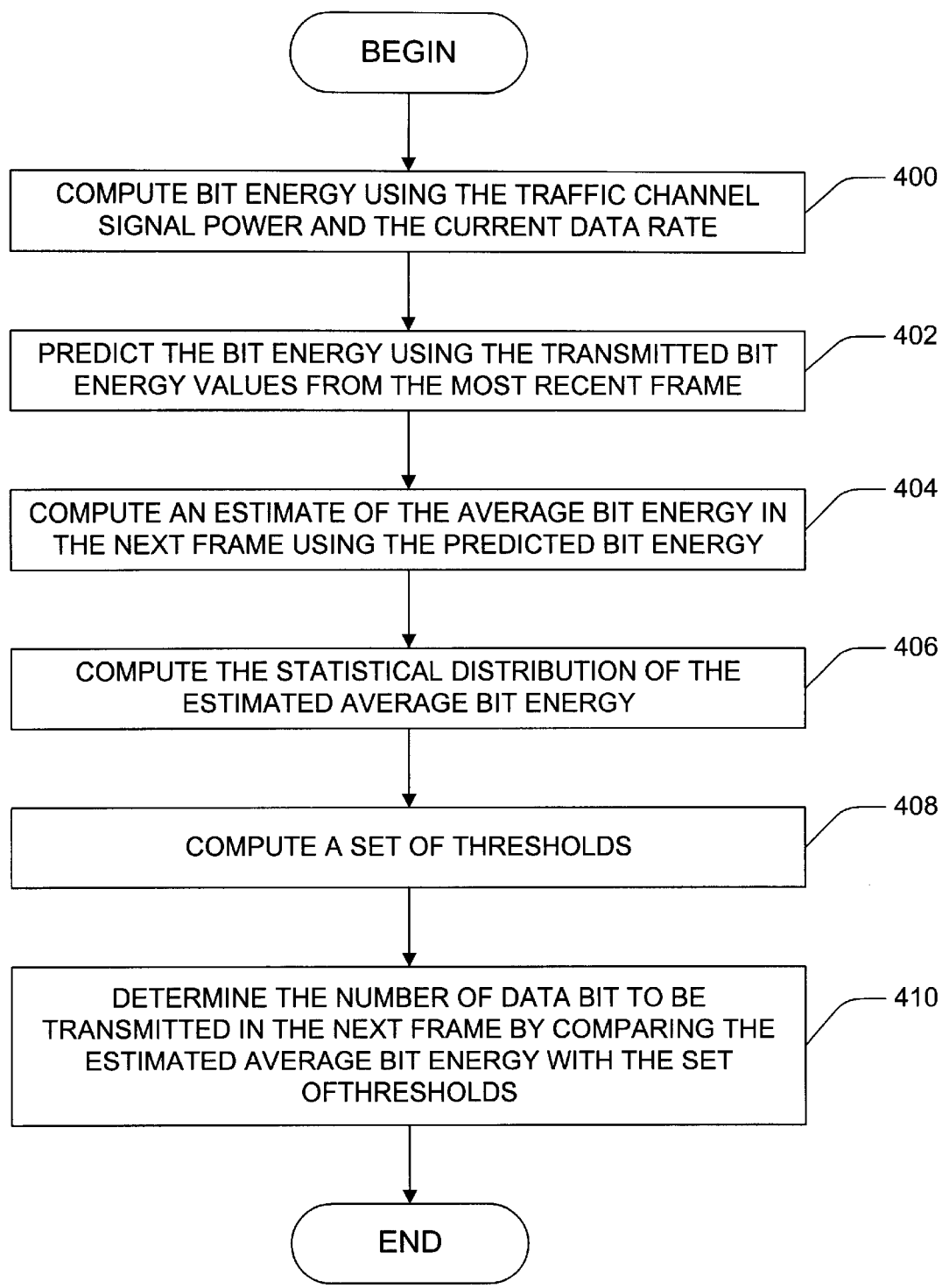
FIG. 4 is a flowchart of the data rate control process.

Prior to the start of each frame, the data rate controller selects the data rate to be used by the transmitter from the set $r_0, r_1, \ldots, r_M$ by performing the following operations, according to the flowchart shown in FIG. 4.

The data rate controller computes the transmitted energy per bit within the most recently transmitted data frame using the traffic channel signal power and the current data rate, at step 400. The data rate controller then predicts the bit energy at $N_s$ points uniformly distributed over the next frame period using the transmitted bit energy values from the most recent frame, at step 402. The bit energy is measured in decibels (dB). The data rate controller computes an estimate of the average bit energy in the next frame using the bit energy predictions $\hat{E}_b(1), \hat{E}_b(2), \ldots, \hat{E}_b(N_s)$ obtained in step 402 (step 404). The estimate of the average bit energy is given by $$Z = \sum_{k=0}^{N_s-1} w(k) \hat{E}_b(k, \quad (4)$$

where the sum of the weights $w(k)$ add up to one. The weights allow the contribution from different bit energy predictions to vary according to their position in the frame. For example, more emphasis may be put on predictions obtained early in the frame, since these are expected to be more accurate. The data rate controller then estimates the statistical distribution of Z over the last few frames based on the current and previous values of Z, at step 406. For some embodiments, this is equivalent to estimating the mean., and standard deviation of Z.

From the estimated short-term statistical distribution of Z, the data rate controller also computes M thresholds $T_1$, $T_2, \ldots, T_M$ (step 408) arranged in ascending order, so that $T_i < T_{i+1}$. The thresholds are typically set so as to provide a specified average bit rate over the frames in the packet. Further, the data rate to be used in the next frame is chosen by comparing the estimated average bit energy Z with the set of thresholds, at step 410. The comparison is done in such a way that rate $r_i$ is chosen when Z falls in the interval between $T_i$ and $T_{i+1}$, where $T_0 = -\infty$ and $T_{M+1} = +\infty$. Consequently, the higher the estimated average bit energy, the lower the data rate used in the next is frame.

In summary, the average data rate obtained over the packet will depend on future values of Z and thus cannot be determined in advance. The present disclosure obviates this problem by taking a statistical approach, in which future values of Z are treated as random variables with known distribution. The thresholds are set so as to give an expected data rate over the distribution of Z. In order to track changes in the statistics of Z due to variations in propagation, environment, the parameters of this distribution are continuously estimated during transmission. The type of distribution can be chosen to match the actual observed statistical behavior of Z.

For some embodiments, the implementation can be considerably simplified when Z is assumed to be normally distributed. The Normal distribution usually provides a good match when bit energy is measured in decibels. Using the Normal distribution, the probability of transmitting $n_i$ bits in a frame is given by $$P_i = Q\left[\frac{T_i - \mu}{\sigma}\right] - Q\left[\frac{T_{i+1} - \mu}{\sigma}\right]. \tag{5}$$

$Q(x)$ is the complementary cumulative distribution function for the Normal distribution, and $\mu$ and $\sigma$ are the mean and standard deviation of Z, respectively. The above probability, $P_i$, is equivalent to the probability of Z falling in the interval between $T_i$ and $T_{i+1}$. Further, the expected number of bits per frame is given by $$\langle N_b \rangle = \sum_{i=0}^{M} n_i P_i. \tag{6}$$

The throughput specified by the user can be expressed as a desired average number of bits per frame, $N_b^*$. In one aspect, the thresholds are set to make the expected number of bits $\langle N_b \rangle$ equal to $N_b^*$. This can be done by first finding a probability distribution $P_0, P_1, \ldots P_M$ that gives $\langle N_b \rangle = N_b^*$ when substituted into Equation (6), and then solving for the threshold values in Equation (5).

When Z is taken to be normally distributed, a considerable simplification can be obtained by pre-computing a set of normalized thresholds $\tilde{T}_1, \tilde{T}_2, \ldots, \tilde{T}_M$ that will satisfy the above throughput requirement for an estimate Z with zero mean and standard deviation equal to one. During packet transmission, the data rate is then adjusted with respect to the actual statistics of Z by using the thresholds $T_i = \sigma \tilde{T}_i + \mu$. The parameters $\mu$ and $\sigma$ are short-term estimates of the mean and standard deviation, respectively. The computation of the normalized thresholds can be carried out before the start of packet transmission. The computation is based only on the target throughput. In fact, sets of normalized thresholds can be pre-computed and stored permanently in the transmitter for a number of different target throughputs. However, the threshold setting for a specific throughput will depend on the set of data rates, or equivalently, on the set of numbers $n_0$, $n_1, \ldots, n_M$. If more than one set of rates is allowed, then a set of thresholds may be stored for every combination of throughput and data rate set.

Figure 5:
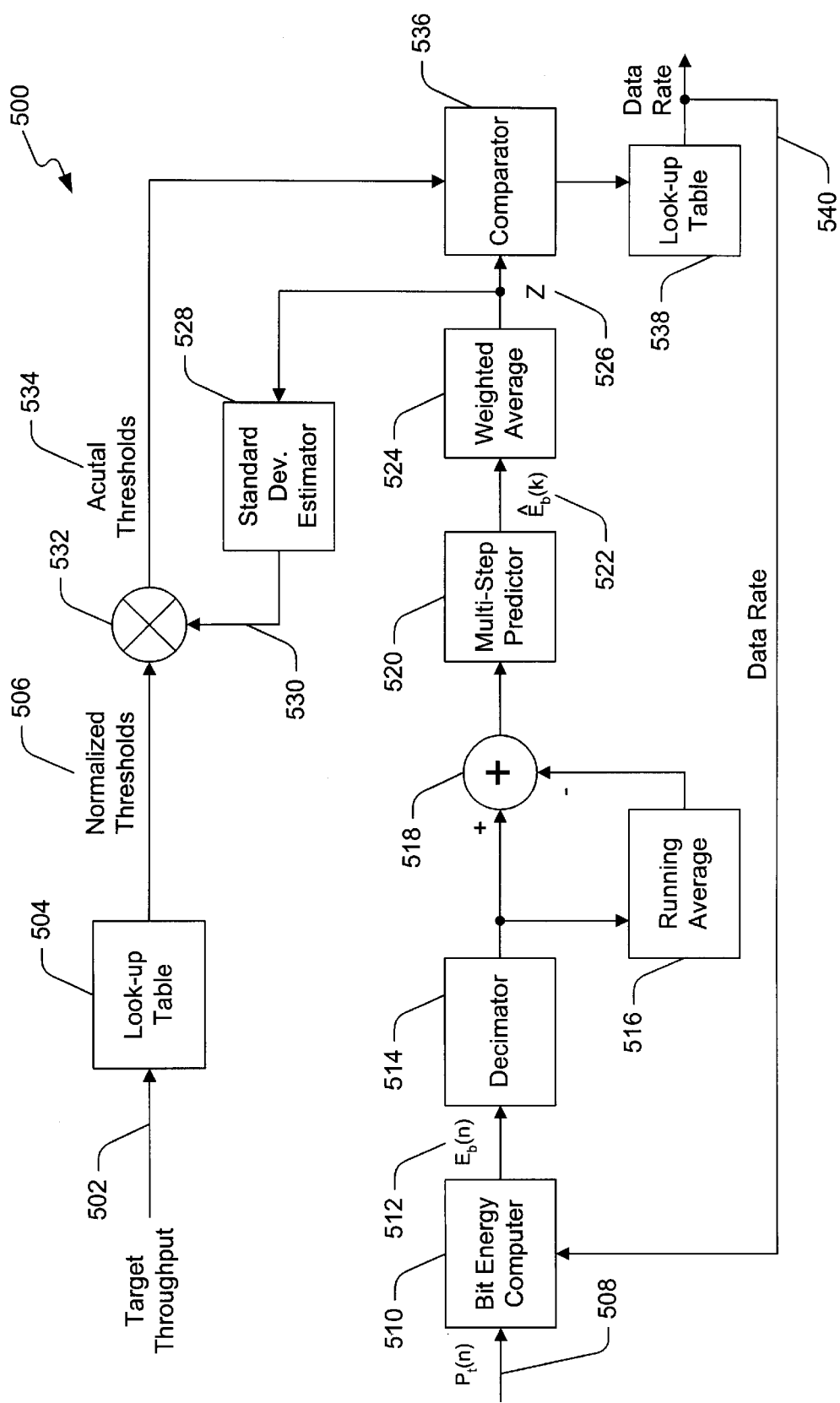
FIG. 5 is a block diagram of a predictive data rate controller.

A preferred embodiment of the data rate controller 500 is shown in FIG. 5. Before the start of a packet transmission, the input target throughput 502 is used to read a set of normalized thresholds 506 from a look-up table 504. In each PC period during the transmission, the transmitted bit energy 512 is computed by a bit energy computer 510 from the traffic channel power $P_t(n)$ 508 and the current data rate 540. The transmitted bit energy 512 is measured in decibel. The $P_t(n)$ 508 is obtained from the open or closed loop power control.

A decimator 514 decimates the stream of bit energy values, arriving at PC bit rate, to $N_s$ samples per frame. A running average 516 is computed and subtracted from the decimated sequence by a differencing element 518. A multi-step predictor 520 is then used to predict the $N_s$ samples 522 in the next frame after arrival of the last bit energy value in the current frame.

Several prediction methods well known from time series analysis could be applied, including standard linear prediction methods based on the Least-Squares (LS) error criterion. Non-linear prediction methods, which do not rely on short-term stationary, may also prove suitable for this task. The average bit energy 526 over the next frame is then estimated by averaging the predicted bit energy samples in a weighted average element 524. In each frame, the value of the estimate Z 526 is used to update a local estimate a 530 in a standard deviation estimator 528.

The normalized thresholds 506 are multiplied by $\sigma$ in a multiplier 532 to obtain the actual thresholds $T_i = \sigma \tilde{T}_i$. Note that $\mu$ can be assumed to equal 0 due to the subtraction of the running average 516. The estimate Z 526 is then compared to the set of actual thresholds 534 in a comparator 536. The outcome of the comparison is used to read the data rate 514 for the next frame in a look-up table 538.

It is desirable to make $N_s$ as small as possible. On the other hand, $N_s$ must be high enough to avoid aliasing the decimated waveform. When the pitch (fundamental frequency component) of the input power waveform exceeds the frame rate $1/T_f$, the frame-averaged bit energy exhibits comparatively small variability and the reduction in average bit energy over multiple frames achieved is small. Thus, to cover the useful range, $N_s$ should be at least two. In practice, $N_s=4$ provides better performance. Larger values show little or no performance improvement.

The time constant (i.e. degree of averaging) used in computing the running average 516 and the short-term standard deviation estimate $\sigma$ 530 should be set with respect to the expected maximum rate of change of the fading statistics.

In the case with a single fallback rate (M=1), a unique probability distributions $P_0$ and $P_1$, can be obtained by solving Equation (6) with $\langle N_b \rangle = N_b^*$. The result is $$P_1 = \frac{1 - N_b^*/n_0}{1 - n_1/n_0} \tag{7}$$

and $P_0 = 1 - P_1$. The single normalized threshold $\tilde{T}_1$ is then obtained by solving Equation (5) with i=1 using again the Normal distribution. This leads to $$\tilde{T}_1 = Q^{-1}(P_1), \tag{8}$$

where $Q^{-1}(x)$ is the inverse of $Q(x)$.

In the case with more than one fallback rate (M>1), there are many probability distributions $P_0, P_1, \ldots, P_M$, which will satisfy Equation (6) with the target throughput. A suitable strategy provides multiple feasible threshold settings that minimize the expected average bit energy over the packet. The expected average bit energy is approximated by $$\langle \overline{E}_{b,packet} \rangle = \frac{\langle E_f \rangle}{\langle N_b \rangle} = \frac{\langle N_b \overline{E}_{b,frame} \rangle}{\langle N_b \rangle}. \tag{9}$$

The expectation is over both the probability distribution $P_0$, $P_1, \ldots, P_M$ and the distribution of $\overline{E}_{b,\,frame}$. Since the denominator in Equation (9) is determined by the target bit rate, minimizing Equation (9) is equivalent to minimizing the expected frame energy $\langle N_b \overline{E}_{b,\,frame} \rangle$. Further, by replacing $\overline{E}_{b,\,frame}$ with its prediction Z, the expected frame energy can be approximated by $\langle N_b Z \rangle$. For a normally distributed Z with zero mean and unit standard deviation, the expected frame energy evaluates to $$\langle N_b Z \rangle = \frac{1}{\sqrt{2\pi}} \sum_{i=1}^{M} (n_i - n_{i-1}) e^{-T_i^2/2}. \quad (10)$$

A set of thresholds that minimizes the object function in Equation (10) while simultaneously satisfying Equation (6) with the target throughput can be determined. Several well-known numerical optimization methods can be used for this purpose. Thus, according to the first aspect as described above, a certain target throughput is specified and the normalized thresholds are set to make the expected throughput equal to the target throughput. The above-described methods for setting thresholds are for illustrative purpose only. Other approaches besides those presented above are possible.

According to the second aspect, only a minimum required throughput is specified. The thresholds are set to achieve the smallest possible average bit energy over the range of permissible throughputs. Such a set of thresholds can be found numerically by computing the normalized thresholds for a large number of throughputs within the permissible range and selecting the particular set of thresholds that yields the smallest value of Equation (10). Sets of thresholds can then be pre-computed in this way and stored permanently in the data rate controller for a number of throughput ranges.

Figure 6:
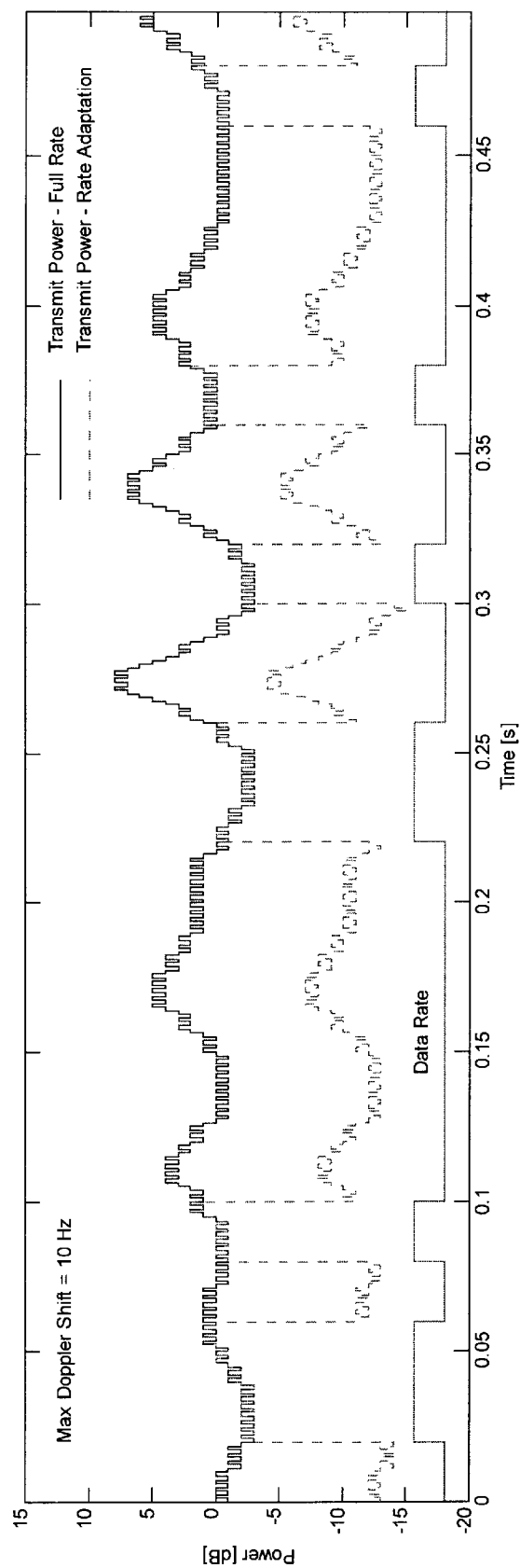
FIG. 6 shows a simulation of rate adaptation with one fallback rate.

FIG. 6 shows a simulation of rate adaptation with one fallback rate according to the preferred embodiment in FIG. 5. The multipath fading and system parameters are identical to those used in the simulation in FIG. 3. Table 1 gives the system parameter values used in the simulation. The normalized threshold was computed using Equation (7) and (8) to obtain an expected normalized throughput $N_b^*/n_0$ of 0.35. A $10^{th}$ order linear LS predictor was used in the simulation. The linear predictor is computed using the covariance method.

TABLE 1

System parameters used in the FIG. 6 simulation

| Parameter | Value |
|---|---|
| Frame Duration | 20 mS |
| PC bit rate | 800 bps |
| PC step size | 1 dB |
| Normalized target throughput | 0.35 |
| Data rates $r_0$, $r_1$ | 153.6 kbps, 9.6 kbps |
| Normalized threshold $T_1$ | −0.505 |
| Number of samples per frame $N_s$ | 4 |
| Weights w(k) | 1/4 |

Figure 7:
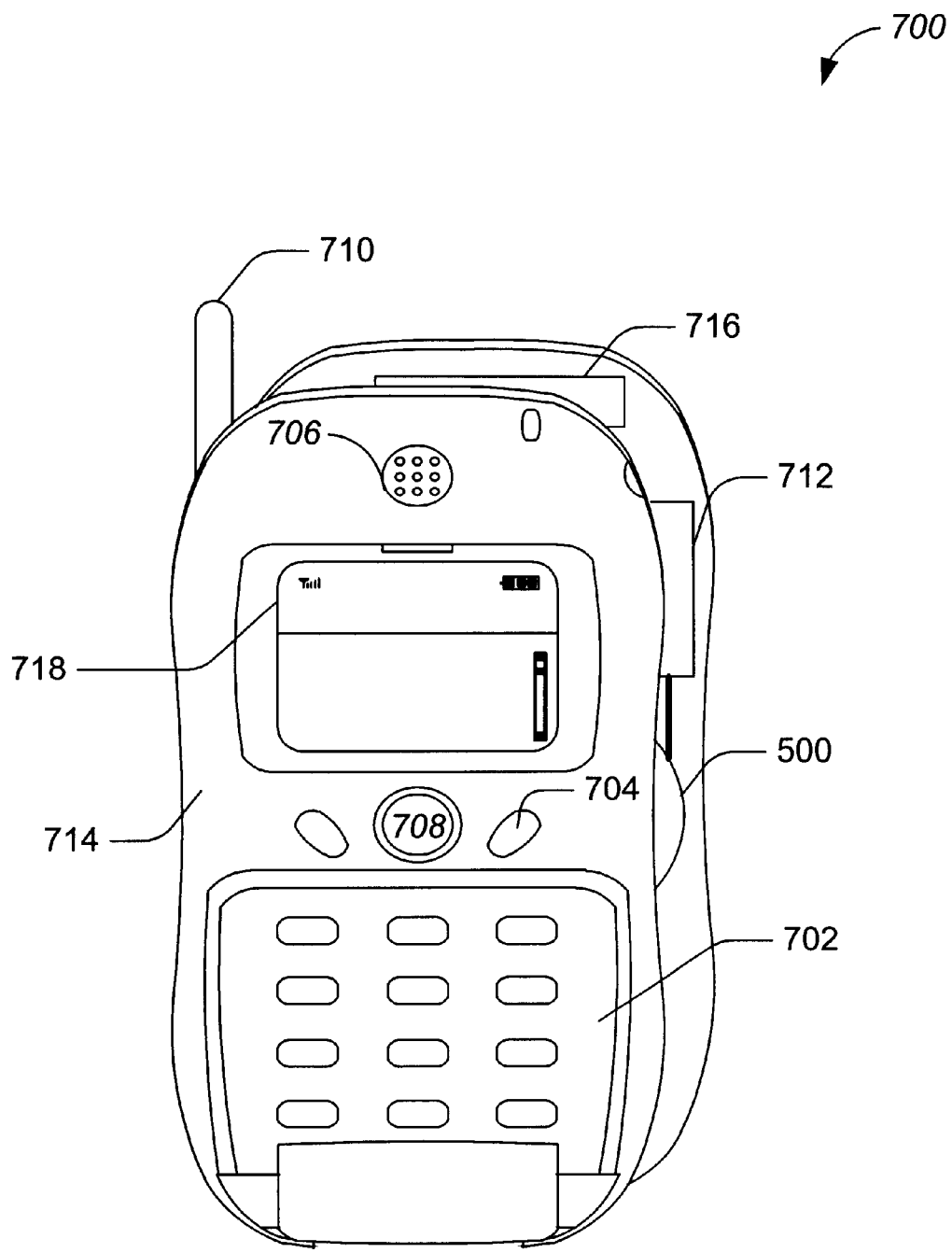
FIG. 7 shows a front perspective view of a cellular telephone according to one embodiment of the present disclosure.

FIG. 7 shows a front perspective view of a cellular telephone 700 according to one embodiment of the present disclosure. The phone 700 uses the transmitter 500 described above for providing specified data rate to the power amplifier 712. The cellular telephone 700 also includes a keypad 702 and various other buttons and indicators 704. The telephone 700 also includes a speaker 706, a microphone 708, an antenna 710, and other communication electronics 716 contained within a telephone housing 714. A display unit 718 is used in conjunction with the keypad 702 to facilitate user inputs.

Figure 8:
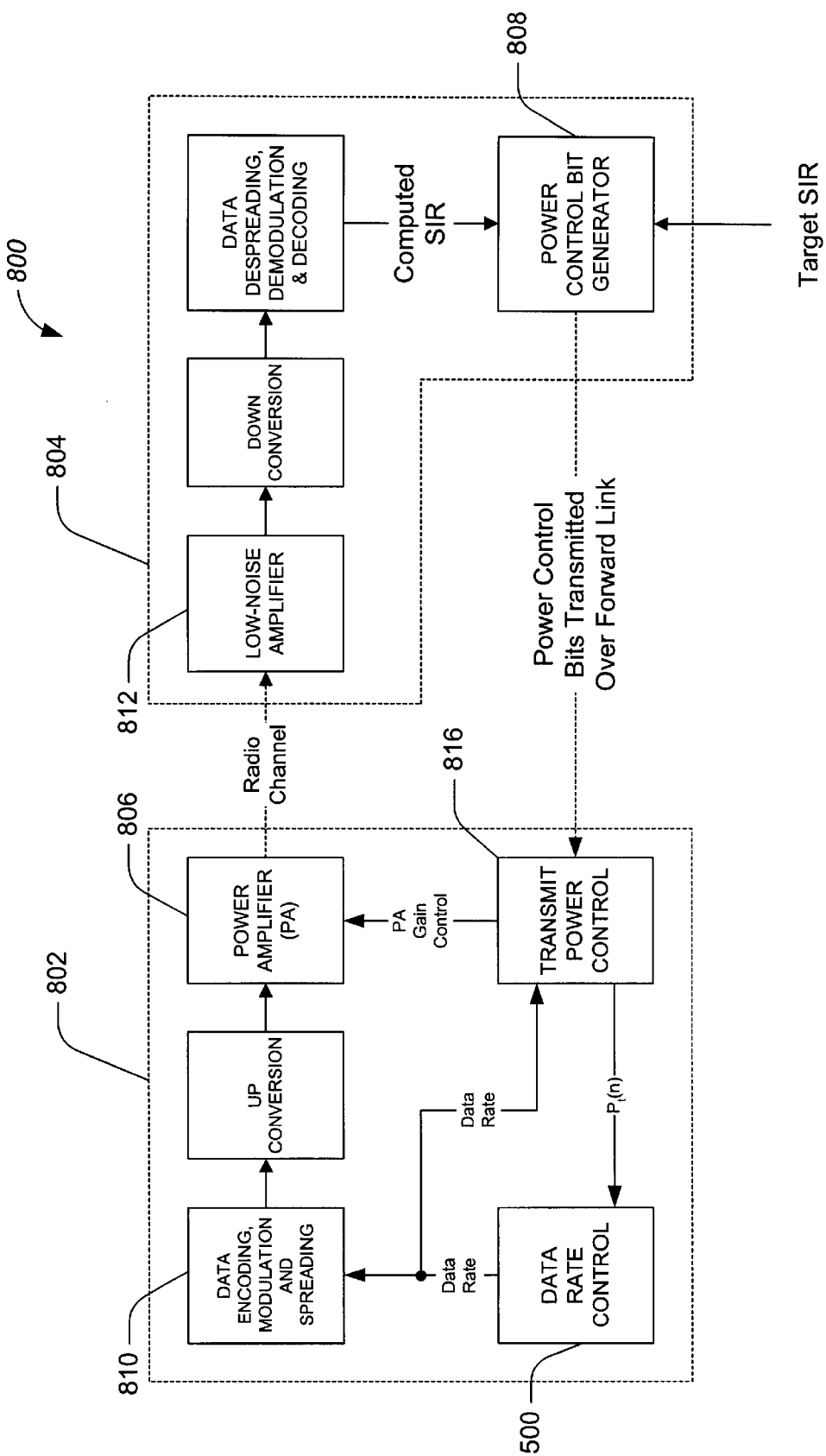
FIG. 8 is a block diagram of a wireless communication system having a predictive data rate controller.

FIG. 8 is a block diagram of a wireless communication system 800 having a predictive data rate controller 500 described in FIG. 5. A base station receiver 804 receives a signal from a mobile station transmitter 802 through a radio channel. A low-noise amplifier 812 and communication electronics 814 in the base station 804 receives and down-converts the signal from the mobile station transmitter 802. A power control (PC) bit generator 808 measures the power level of the signal and generates a PC bit for a particular power control period. The power control bit is sent over the forward link where it is received by the mobile station receiver (not shown) to the mobile station transmitter 802.

The transmit power controller 816 processes the PC bit and sends a power level signal to the power amplifier 806. The transmit power controller 816 also sends the power level signal to the data rate controller 500. The data rate controller 500 predictively determines a data rate for a frame of data using previously transmitted bit energy on a traffic channel and a target data throughput. An indication of the data rate is then sent to the data encoding, modulation and spreading circuit 810.

Figure 9:
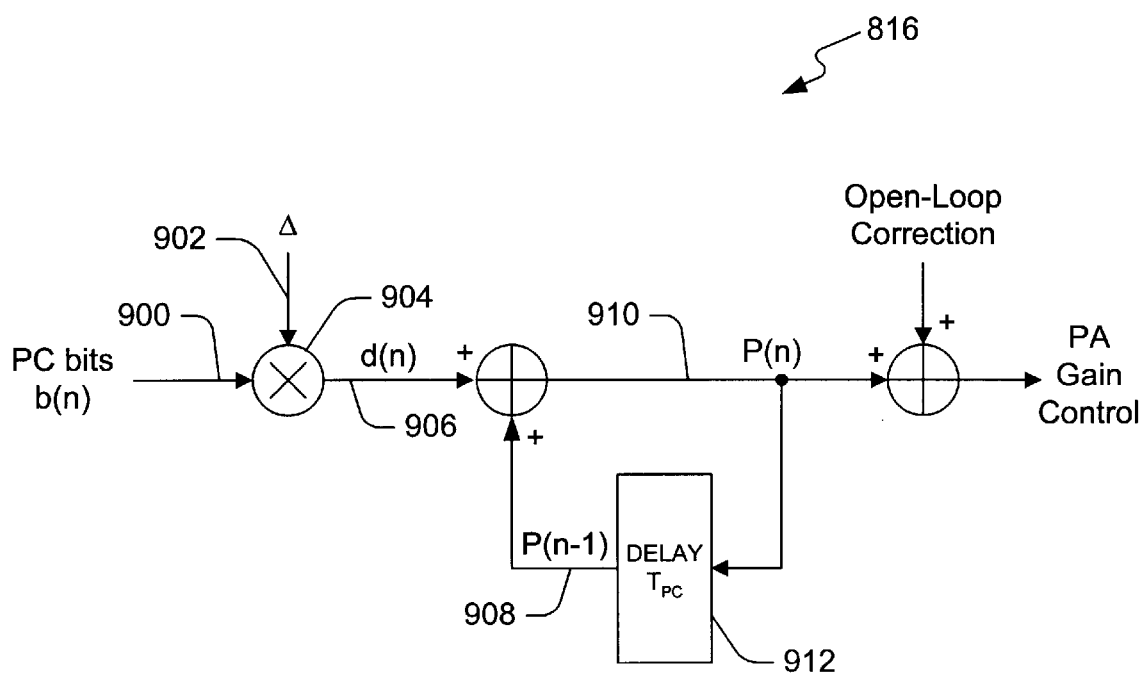
FIG. 9 illustrates a transmit power controller in accordance with an embodiment of the present invention.

FIG. 9 illustrates the transmit power controller 816 in accordance with an embodiment of the present invention. The incoming stream of PC bits 900 and a step size Δ 902 are processed by a modulator 904 to generate a power correction d(n) 906. A previous transmit power level P(n−1) 908 is provided by time-delaying the current power level P(n) 910 through a delay element 912, such as a buffer or a flip-flop.

The reduction of average bit energy achieved with a transmitter operating according to the present disclosure compared to a fixed-rate transmitter has been estimated by simulation. The reduction of average bit energy will depend on the variability of the bit energy estimate Z and thus on the statistics of the fading radio channel.

Figure 10:
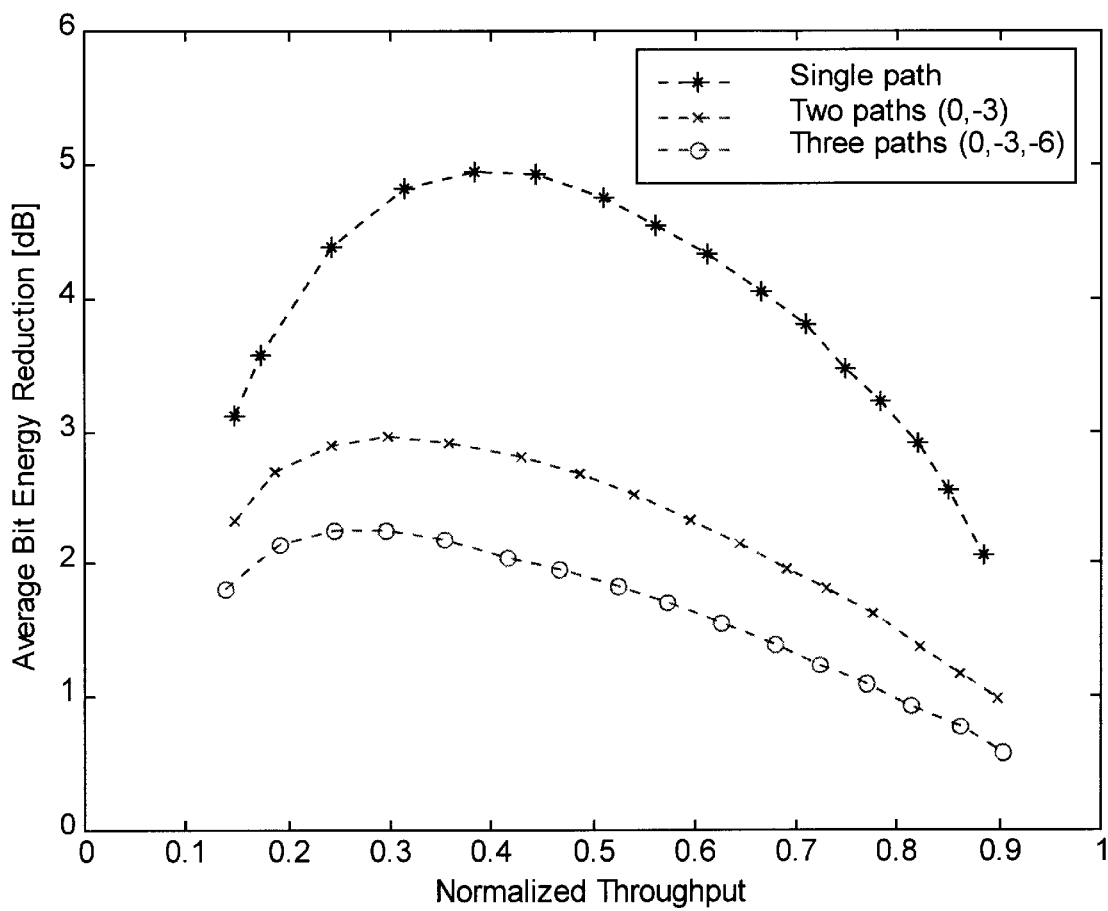
FIGS. 10, 11, and 12 show plots of average bit energy reduction as a function of measured normalized throughput using the predictive data rate controller versus the fixed-rate controller.

In FIG. 10, the reduction of average bit energy, obtained by a simulation over several thousand frames, has been plotted as a function of measured normalized throughput. The plot shows three different Rayleigh fading channels with varying number of multipath components and a maximum Doppler shift of 10 Hz. In the case of the two-path channel, the mean power of the second path was set 3 dB below that of the first path. In the case of the three-path channel, the mean power of the second and third paths were set 3 dB and 6 dB below that of the first path, respectfully. The systems parameters were the same as those given in Table 1. The achieved energy reduction diminishes with increasing number of multipath components. This is due to the fact that the variability of the fading amplitude on the receiver side decreases with the growing number of multipath components. In all simulated cases, the deviation of the measured throughput from the target throughput was no more than a few percent, and in many instances a fraction of a percent. This verifies the validity of the Normal distribution as a statistical model for the bit energy estimate Z.

Figure 11:
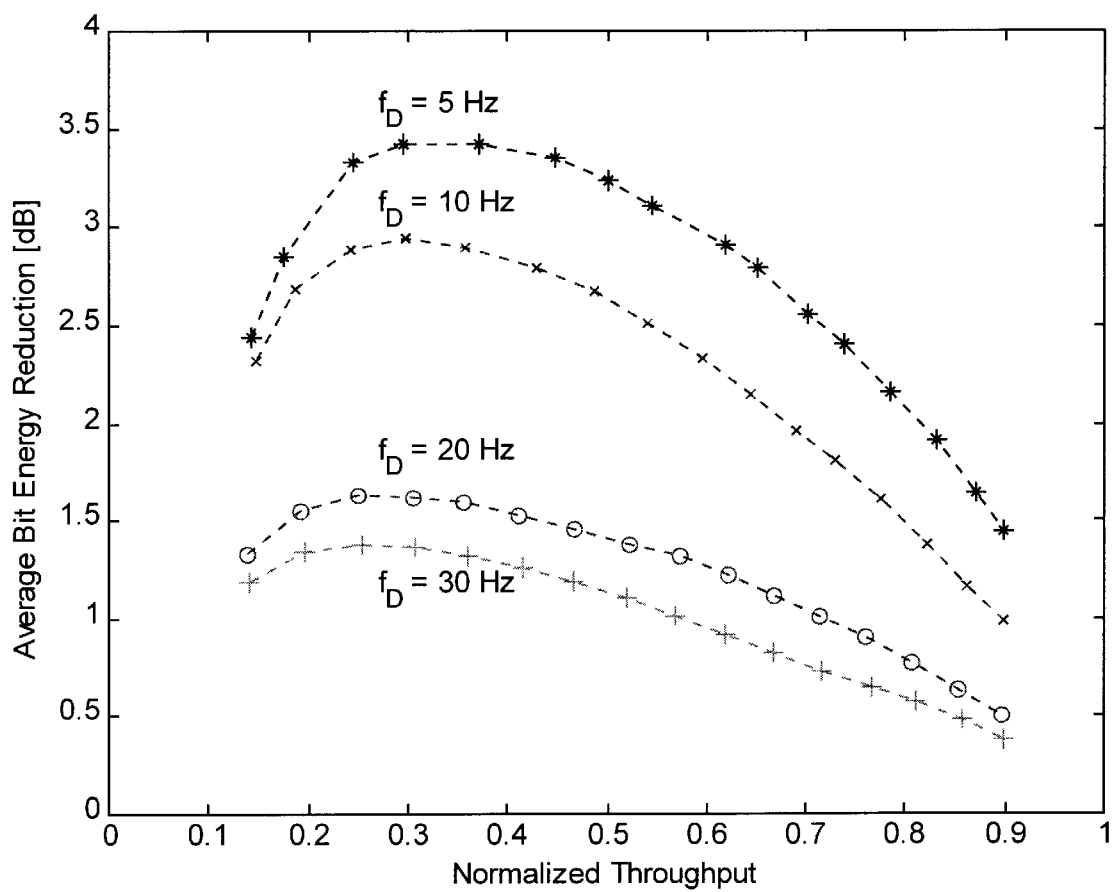

In FIG. 11, the bit energy reduction has been plotted versus normalized throughput for a two-path Rayleigh fading channel with maximum Doppler shift equal to 5, 10, 20, and 30 Hz. The mean power of the second path was set 3 dB below that of the first path. An increase in fading rate leads to smaller variations in the frame-averaged bit energy, as well as to a reduction of prediction accuracy. As a result, the energy reduction diminishes with increasing Doppler shift, or equivalently, fading rate.

Figure 12:
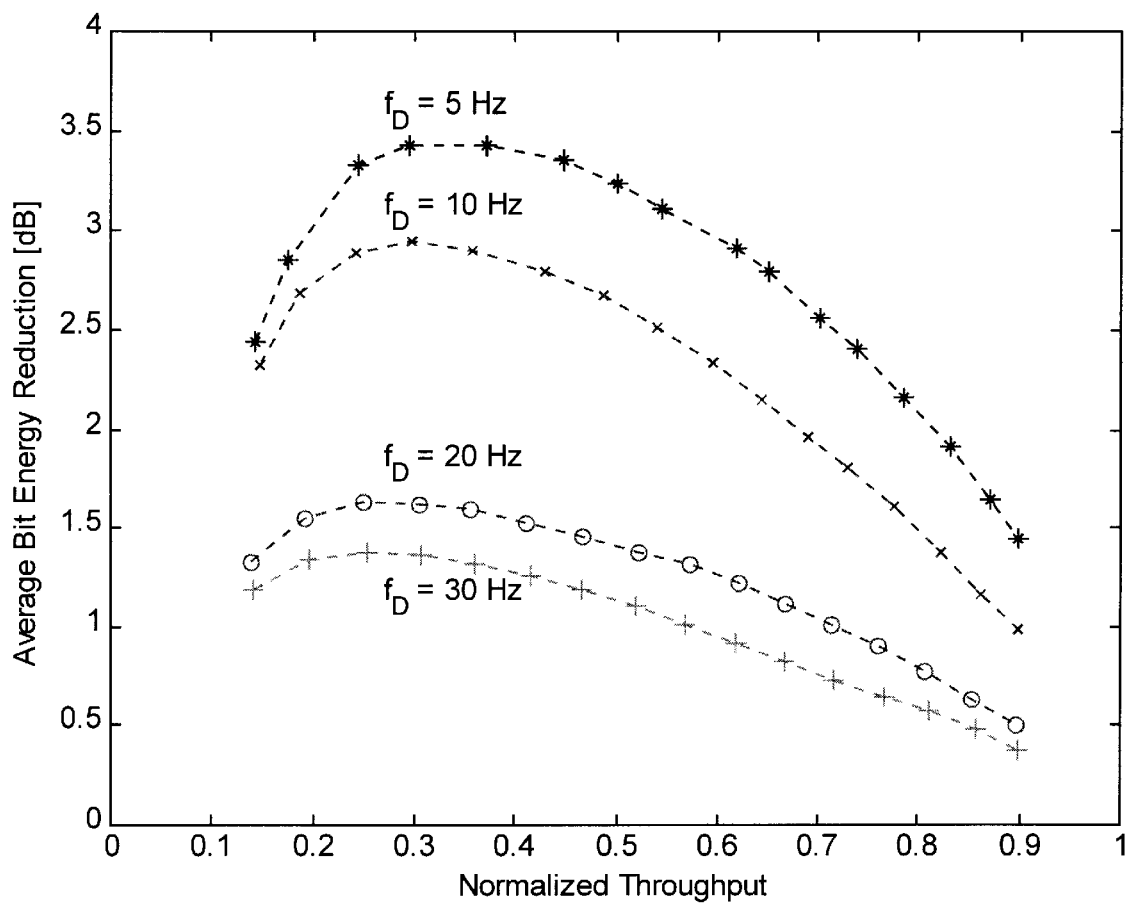

To study the performance loss caused by prediction inaccuracy, simulations were also carried out with the lease square prediction of bit energy replaced by the actual transmitted bit energy. The actual bit energy corresponds to an ideal (zero error) predictor. FIG. 12 shows a plot of the bit energy reduction versus normalized throughput obtained with ideal prediction and with linear LS prediction for the same two-path Rayleigh fading channel with Doppler shifts of 10 and 30 Hz. The results indicate that there is a significant performance loss due to prediction inaccuracy. Further, the performance loss increases with increasing Doppler shift. Other predictor structure can be used to reduce this performance loss.

The energy reduction observed in FIGS. 10, 11, and 12 attains its maximum for a normalized throughput around 0.3. Since no further energy reduction is possible, reducing the target throughput below this value clearly serves little purpose. In general, the throughput at which the maximum energy reduction is obtained will depend on the particular set of data rates used. Therefore, for a given set of data rates, there is a lower limit for the range of usable target throughputs. Further, for a power preservation regime that calls for minimized transmit energy, there is a specific target throughput that can be used to provide a consistent near-minimum transmit energy over a wide range of fading distributions and Doppler shifts.

Other embodiments and variations are possible. For example, although the above discussions focused on reverse link power control, the same principles, including the concept of pilot-based power control, also apply to forward link power control. In addition, no assumption is made regarding the specific method by which data is encoded and modulated in the transmitter to achieve different data rates. Further, the power control applies equally well to mobile and base stations.

What is claimed is:

1. A wireless transmitter, comprising:
   a power transmitter, operating to transmit a data stream; and
   a data rate controller operating to predictively determine a data rate for a frame of said data stream, using previously transmitted bit energy of a traffic channel, and a target data throughput; wherein
      said data rate controller includes a first selector to receive a target data throughput, said first selector operating to select a set of normalized thresholds based on said target data throughput;
      said data rate controller further includes a bit energy computer to receive signal power level and a current data rate of a traffic channel, said bit energy computer computing transmitted bit energy on said traffic channel;
      said data rate controller further includes a predictor operating to predict bit energy distributed over a frame period using said transmitted bit energy;
      said data rate controller further includes an estimator configured to compute a statistical distribution of average bit energy in said frame period using said predicted bit energy;
      said estimator includes a weighted average calculator configured to compute average bit energy in said frame period by averaging said predicted bit energy; and
      said averaging is performed by multiplying each predicted bit energy value with a specified weight, such that a sum of specified weights is equal to one.

2. The transmitter of claim 1, wherein said specified weights enable contributions from different predicted bit energy values to vary according to position of said values in said frame period.

3. The transmitter of claim 2, wherein said data rate controller further includes:
   a running average computer adapted to compute a running average of a decimated bit energy; and
   a differencing element operating to subtract said running average from said decimated bit energy.

4. A wireless transmitter, comprising:
   a power transmitter, operating to transmit a data stream; and
   a data rate controller operating to predictively determine a data rate for a frame of said data stream, using previously transmitted bit energy of a traffic channel, and a target data throughput; wherein
      said data rate controller includes a first selector to receive a target data throughput, said first selector operating to select a set of normalized thresholds based on said target data throughput;
      said data rate controller further includes a bit energy computer to receive signal power level and a current data rate of a traffic channel, said bit energy computer computing transmitted bit energy on said traffic channel;
      said data rate controller further includes a predictor operating to predict bit energy distributed over a frame period using said transmitted bit energy;
      said data rate controller further includes an estimator configured to compute a statistical distribution of average bit energy in said frame period using said predicted bit energy; and
      said data rate controller further includes a second selector to determine a new data rate using said set of normalized thresholds, and said average bit energy and its statistical distribution.

5. A wireless transmitter, comprising:
   a power transmitter, operating to transmit a data stream; and
   a data rate controller operating to predictively determine a data rate for a frame of said data stream, using previously transmitted bit energy of a traffic channel, and a target data throughput; wherein
      said data rate controller includes a first selector to receive a target data throughput, said first selector operating to select a set of normalized thresholds based on said target data throughput;
      said data rate controller further includes a bit energy computer to receive signal power level and a current data rate of a traffic channel, said bit energy computer computing transmitted bit energy on said traffic channel;
      said data rate controller further includes a predictor operating to predict bit energy distributed over a frame period using said transmitted bit energy; and
      said data rate controller further includes a decimator operating to decimate said transmitted bit energy to a specified number of samples per frame before being sent to said predictor.

6. A wireless transmitter, comprising:
   a first selector to receive a target data throughput, said first selector configured to select a set of normalized thresholds based on said target data throughput;
   a bit energy computer to receive signal power of a traffic channel and a current data rate of said traffic channel, said bit energy computer computing transmitted bit energy on said traffic channel;
   a predictor operating to predict bit energy distributed over a frame using said transmitted bit energy;
   an estimator configured to compute a statistical distribution of average bit energy in said frame period using said predicted bit energy;
   a comparator to receive said normalized thresholds, and said average bit energy and its statistical distribution, said comparator determining a new data rate; and a decimator operating to decimate said transmitted bit energy to a specified number of samples per frame before being sent to said predictor.

7. A wireless transmitter, comprising:

a first selector to receive a target data throughput, said first selector configured to select a set of normalized thresholds based on said target data throughput;

a bit energy computer to receive signal power of a traffic channel and a current data rate of said traffic channel, said bit energy computer computing transmitted bit energy on said traffic channel;

a predictor operating to predict bit energy distributed over a frame using said transmitted bit energy;

an estimator configured to compute a statistical distribution of average bit energy in said frame period using said predicted bit energy;

a comparator to receive said normalized thresholds, and said average bit energy and its statistical distribution, said comparator determining a new data rate;

a running average computer adapted to compute a running average of a decimated bit energy; and a differencing element operating to subtract said running average from said decimated bit energy.

8. A wireless transmitter, comprising:

a first selector to receive a target data throughput, said first selector configured to select a set of normalized thresholds based on said target data throughput;

a bit energy computer to receive signal power of a traffic channel and a current data rate of said traffic channel, said bit energy computer computing transmitted bit energy on said traffic channel;

a predictor operating to predict bit energy distributed over a frame using said transmitted bit energy:

an estimator configured to compute a statistical distribution of average bit energy in said frame period using said predicted bit energy; and a comparator to receive said normalized thresholds, and said average bit energy and its statistical distribution, said comparator determining a new data rate; wherein said estimator includes a weighted average calculator configured to compute average bit energy in said frame period by averaging said predicted bit energy; and said averaging is performed by multiplying each predicted bit energy value with a specified weight, such that a sum of specified weights is equal to one.

9. The transmitter of claim 8, wherein said specified weights enable contributions from different predicted bit energy values to vary according to position of said values in said frame period.

* * * * *